United States Patent [19]
Poplack et al.

[11] 3,764,713
[45] Oct. 9, 1973

[54] METHOD FOR TREATING BEEF SUET TO PRODUCE PARTIALLY DEFATTED TISSUE HAVING A RELATIVELY LOW BACTERIA COUNT USEFUL FOR HUMAN CONSUMPTION

[75] Inventors: William J. Poplack, Birmingham; Edward W. McMullen, Huntington Woods; Hemendra Basu, Warren, all of Mich.

[73] Assignee: Unisource Foods Corporation, Detroit, Mich.

[22] Filed: May 8, 1972

[21] Appl. No.: 250,924

Related U.S. Application Data

[63] Continuation-in-part of Ser. No. 221,818, Jan. 28, 1972, abandoned.

[52] U.S. Cl. ............................. 426/233, 23/230 B
[51] Int. Cl. ............................................ A22c 18/00
[58] Field of Search .......................... 99/7, 107, 108; 260/412.6, 428

[56] References Cited
UNITED STATES PATENTS

| | | | |
|---|---|---|---|
| 3,020,160 | 2/1962 | Downing et al. | 99/107 X |
| 3,177,080 | 4/1965 | Alberts | 99/108 |
| 3,346,393 | 10/1967 | Bradford | 99/108 |

*Primary Examiner*—Hyman Lord
*Attorney*—Eric P. Schellin et al.

[57] ABSTRACT

Beef suet is first tested by a rapid means. The beef suet is then ground and introduced into a melt tank. Thereafter the material is further disintegrated whereby a lighter phase and a heavier phase is produced. The lighter phase is a tallow which is refined. The heavier phase is a useful partially defatted tissue.

5 Claims, No Drawings

3,764,713

METHOD FOR TREATING BEEF SUET TO PRODUCE PARTIALLY DEFATTED TISSUE HAVING A RELATIVELY LOW BACTERIA COUNT USEFUL FOR HUMAN CONSUMPTION

This is a continuation-in-part application to U.S. application Ser. No. 221,818, filed Jan. 28, 1972 now abandoned.

BACKGROUND OF THE INVENTION

The invention relates to a new method of producing partially defatted beef fatty tissue which has a relatively low number of bacteria colonies. At the present time the partially defatted beef fatty tissue produced from suet is generally wholesome and a desirable ingredient in many food products. However, the processing temperatures are near optimum for bacterial growth. Therefore, there is usually an increase in the bacterial level during processing. Even though the raw materials are handled carefully, and all are visually checked for wholesomeness, it is still possible to have batches of suet with widely varying levels of bacterial content without any differences being visually apparent. It will be appreciated that a combination of a wide variation of suet raw material having already present a relatively high bacterial level will produce a partially defatted beef fatty tissue with an unacceptable high bacterial level due to the fact that the bacteria already present will multiply geometrically.

By being able to judiciously select suet having a low bacterial level for defatting, a highly useful and desirable product is obtained. Due to the low bacterial level, the product may readily be employed in human consumption. It will be appreciated that the concept is predicated upon obtaining a product having acceptable relatively low bacterial levels. Obviously, the determination must be made rapidly as the suet must be used as quickly as possible after receipt from the trimming house. A conventional plate method requiring incubation for periods of time of up to 48 hours cannot be acceptable. Now, with the advent of means for rapidly testing for a substance present in all terrestrial life, a correlation may be employed between such substance and the quantity of bacteria present in the suet.

Adenosinetriphosphate (ATP) is present in all forms of terrestrial life, thus making it an indicator of life at all levels of cellular organization. Much work has gone into the development of assay methods for ATP, and the sensitivity of such methods has been well developed. One such assay method involves the use of firefly lantern extracts, or the purified constituents of firefly lanterns which when combined with ATP, will produce a bioluminescent reaction proportional to the amount of ATP present in a test sample. It has now been discovered that not only can this bioluminescent reaction be used as a technique for the demonstration of the presence or absence of life, but also establishment of the presence of invading bacteria in host tissues.

Determination of ATP concentrations by this method of the luciferin/luciferase bioluminescent reaction as applied to foods has been discussed in some considerable detail by Sharpe, A.N.; Woodrow, M. N. and Jackson, A. K. (1970) *J. Appl. Bact.* 33, 758–767. The techniques attendant thereto has been considerably facilitated by the introduction of a sensitive digital-readout photometer and reagent packs containing the enzyme-substrate mixture as described in U. S. Pat. No. 3,359,973. The high sensitivity of the reaction allows detection of minute amounts of ATP, and therefore also of small amounts of living tissues, of course, including bacteria.

With respect to foods, the utility of ATP determination as a means of detecting bacterial contamination in foods depends on the efficiency with which the bacterial ATP can be separated from nonbacterial ATP derived from the original tissue, and/or on their relative levels.

The instrument disclosed in U. S. Pat. No. 3,359,973 includes essentially an extremely sensitive photocell or photomultiplier coupled to suitable digital readout mechanisms. When a microsample containing ATP is injected into a suitably buffered reaction mixture of luciferase and luciferin, the peak intensity of the resulting light flock is directly proportional to the concentration of ATP.

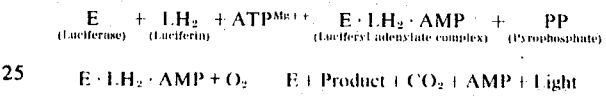

REAGENTS

Low Response (LR) water

Distilled water was acidified with hydrochloric acid (1 drop of concentrated acid per liter), boiled 5 minutes and neutralized with sodium hydroxide solution. Bottles containing LR water were autoclaved and stored.

Buffer solution (0.01M)

pH 7.4 buffer was made from LR water and the morpholinopropane sulphonic acid (MPOS) supplied. 0.01M magnesium sulfate was included in the buffer.

Luciferin/luciferase (L/L)

Vials of L/L mixture were stored at minus 20°C until required. LR buffer (3 ml) was added to one vial of enzyme/substrate mixture approximately 30 minutes before required. The solution was dispensed in 0.1 ml amounts into cleaned cuvettes, ready for use. The time delay allowed intrinsic luminescence to reduce to insignificant levels.

Dimethyl Sulfoxide

A normal laboratory reagent was employed without further purification, having a density of 1.098. This constituted the extractant solution which was prepared daily by diluting 9 parts with 1 part MOPS buffer.

In carrying out the invention beef suet samples were taken from large refrigerated batches at less than 50°F coming into the plant. These large batches will weigh between 800 and 1,200 pounds. Sufficient samples of beef suet were taken from each batch to accomplish a good random sampling. The suet samples had an approximate size of 5 cm × 5 cm. Each was swabbed with a swab of sterile cotton on a stick and the contents were taken in 5 ml of LR water.

The water samples were filtered through a 5 micron filter to remove tissue cells and then bacterial cells were collected on a 0.45 micron filter. ATP was then released from the cells by means of an extraction step.

Prior to collection of the bacterial cells on the 0.45 micron filter, the filters were first washed with LR water. The filter and centrifuge tube were then inserted into a filter stand and 1.0 ml of buffer was added to the filter and vacuum was applied. When the liquid was through, the vacuum was broken. The filtrate from the 5 micron filter in the amount of 1.0 ml was then added to the filter to collect the organisms. Vacuum was applied and as soon as the liquid disappeared below the surface of the filter, the vacuum was broken. The organisms were then washed with 1 ml buffer. As soon as the buffer disappeared below the surface of the filter, the vacuum was broken and the filtrate was discarded. The filter was removed and shaken vigorously to remove any liquid clinging to the under surface. A clean centrifuge tube was then put into the filter stand. The organism cells were then typed by adding 0.2 ml 90 percent DMSO to the filter. After 20 seconds, vacuum was applied, and the material was collected in the centrifuge tube. To the filter unit 0.5 ml MOPS buffer was added and after 10 seconds, pulled through into the centrifuge tube. This operation was repeated to completely rinse the extracted ATP into the collection tube. While applying vacuum, the filter stand was shaken vigorously to dislodge any adhering droplets. The vacuum was broken, the filter was discarded, and the centrifuge tube containing the test material was removed and left in an ice bucket until assayed. The readout instrument, employing the photometer, is used to provide the test result to show the quantity of bacterial cells per ml is calibrated so that the digital reading is multiplied by 1.2. The calibration is accomplished with a standard ATP sample.

The test was conducted by adding the extractant containing the ATP in an amount of 0.01 ml to 0.1 ml amounts of an LR MOPS buffered solution containing luciferase and luciferin. A transparent cuvette was employed for the two mixtures. The cuvette containing the luciferse and luciferin was just positioned in the photometer instrument which shields the cuvette and the photocell from extraeous light. When the ATP containing extractant is added as by injection, to the cuvette, a flash of very low intensity bioluminescent light results.

The following samples are based upon the above set forth method of assaying the number of cells of bacteria. These readings were then correlated with plate count results to provide a basic of the screening technique according to bacterial contamination.

TABLE

| Example | Instrument Reading | Bacteria/ml (AX 1.2) | Bacteria/ml Plate Count |
|---|---|---|---|
| 1 | $5.9 \times 10^6$ | $7.08 \times 10^6$ | $8.5 \times 10^6$ |
| 2 | $2.42 \times 10^5$ | $2.90 \times 10^5$ | $2.8 \times 10^5$ |
| 3 | $1.12 \times 10^5$ | $1.34 \times 10^5$ | $0.32 \times 10^5$ |
| 4 | $2.58 \times 10^5$ | $3.10 \times 10^5$ | $0.30 \times 10^5$ |
| 5 | $3.20 \times 10^5$ | $3.84 \times 10^5$ | $1.10 \times 10^5$ |
| 6 | $5.93 \times 10^5$ | $7.12 \times 10^5$ | $0.11 \times 10^5$ |
| 7 | $1.88 \times 10^5$ | $2.26 \times 10^5$ | $0.0011 \times 10^5$ |

It has been learned that when the bacterial cells per ml are very high, the instrument readings give a very good correlation with the Plate Count results. When the bacterial cells per ml are in the lower range, that is, below 100,000, most of the time it is very difficult to get a good correlation. Similar observations were made by the author, A. N. Sharpe et al in their article mentioned in the above while investigating ATP levels in food contaminated by bacteria. According to these authors for the result to be significant in terms of bacterial numbers, the bacterial contribution to total ATP must be as great or greater than intrinsic ATP in the substrate material.

The invention, therefore, contemplates the rapid determination of the bacterial count per ml of suet as the initial step. After the determination has been made, only the batches containing the acceptable low level count of, say, 500,000/ml could be utilized. The selected suet is maintained at a maximum of 50°F prior to treatment. The selected suet is fed to a coarse grinder. From the grinder it is conveyed to the top of a vertical agitated heated melt tank wherein the ground suet is heated to a temperature of between 95°–120°F., preferably in the range of 100° to 110°F. The average dwell time is about 15 minutes. The melted suet is removed from the bottom of the tank and transferred to a further size reduction apparatus such as a vertical hammer mill. The resultant therefrom is pumped to a centrifuge where the heavier solid is separated from the lighter edible tallow. The lighter phase is refined further to produce edible tallow. The heavier phase constitutes the partially defatted beef fatty tissue which is a desirable by-product. This product is then chilled in a swept surface heat exchanger to a temperature of less than 40°F. preferably 32° to less than 40°F. The chilled product is packaged and immediately frozen.

The resultant product by being wholesome is used in the preparation of food for human consumption.

What is claimed is:

1. A method for producing partially defatted beef fatty tissue comprising the following steps in sequence:
   a. subjecting chilled suet having a temperature of less than 50°F. and having a bacteria count of less than 500,000/ml to a grinding step;
   b. heating the suet to a temperature of between 95°–120°F.;
   c. further grinding the suet thereby producing a lighter phase comprising tallow and a heavier phase comprising partially defatted beef tissue;
   d. separating the two phases
   e. cooling the partially defatted beef tissue to a temperature of between 32° to less than 40°F.;
   f. freezing the partially defatted beef tissue.

2. A method for producing partially defatted beef fatty tissue from chilled suet having a temperature of less than 50°F. and having a bacterial level of less than 500,000/ml., said bacteria containing adenosinetriphosphate comprising the following steps in sequence:
   a. determining said bacterial level of suet by assaying the quantity of adenosinetriphosphate including collecting a quantity of surface bacteria from the suet, dispersing said bacteria in a quantity of water, then filtering the bacteria containing water through a 5 micron filter to remove tissue cells, thereafter filtering the filtrate through a 0.45 micron filter whereby the bacteria is collected on the surface of the filter, liberating the adenosinetriphosphate from the bacteria with dimethyl sulfoxide, then extracting the adenosinetriphosphate with a liquid, thereafter adding the resultant to a mixture of luciferase and luciferin whereby a resultant light impulse is produced the intensity of which is proportional to the amount of adenosinetriphosphate in solution;
   b. subjecting that chilled suet having a bacteria count of less than 500,000/ml. to a grinding step;
   c. heating the suet to a temperature of between 95–120°F.;

d. further grinding the suet thereby producing a lighter phase comprising tallow and a heavier phase comprising partially defatted beef tissue;
e. separating the two phases.

3. The method of claim 2 wherein the chilled suet is at a temperature of less than 50°F.

4. The method of claim 2 wherein the separated heavier phase is cooled to a temperature of less than 40°F.

5. The method of claim 3 wherein the separated heavier phase is cooled to a temperature of 32°F. to less than 40°F. and is then frozen.

* * * * *